United States Patent [19]

Bailie

[11] 4,318,780
[45] Mar. 9, 1982

[54] MULTI-STAGE FLASH EVAPORATOR DESIGN

[75] Inventor: Robert E. Bailie, Fort Lauderdale, Fla.

[73] Assignee: Westinghouse Electric Corp., Pittsburgh, Pa.

[21] Appl. No.: 165,885

[22] Filed: Jul. 3, 1980

Related U.S. Application Data

[63] Continuation of Ser. No. 967,822, Dec. 8, 1978, abandoned.

[51] Int. Cl.³ .......................... B01D 3/02; B01D 3/10
[52] U.S. Cl. ............................... 202/172; 159/2 MS; 202/205
[58] Field of Search .................... 159/2 MS, 2, 15, 22, 159/18; 203/10, 11; 202/173, 174, 234, 172, 205

[56] References Cited

U.S. PATENT DOCUMENTS 3,763,014 10/1973 Barba et al. .......................... 202/173

FOREIGN PATENT DOCUMENTS 2542146 9/1975 Fed. Rep. of Germany .
1018174 1/1966 United Kingdom .
1105532 3/1968 United Kingdom .

Primary Examiner—Frank Sever
Attorney, Agent, or Firm—E. F. Possessky

[57] ABSTRACT

A multi-stage flash evaporator design wherein two flash evaporator stages are paired in tandem with each individual condenser tube bundle. The condenser tube bundle is enclosed in a housing that is partitioned to define two separate condenser chambers and the housing is also partitioned to define two cross-flow evaporator stages. The condenser tubes extend to opposite ends of the housing and each evaporator chamber has a width substantially equal to the full extent of the condenser tubes with the brine entry port extending the full width of such chamber; however, the vapor from each flash chamber is directed to only a portion (i.e. generally one-half) of the condenser bundle with the partitions maintaining each condenser portion generally sealed from the vapor of the adjacent evaporator chamber. An internal vent orifice directs the non-condensible vapors of the high temperature chamber into the low temperature chamber.

14 Claims, 4 Drawing Figures

MULTI-STAGE FLASH EVAPORATOR DESIGN

This application is a continuation of Ser. No. 967,822, filed on Dec. 8, 1978 and now abandoned.

BACKGROUND OF THE INVENTION

1. Field of the Invention

This invention relates to a construction design for large multi-stage flash evaporators used in the desalting of seawater, and more particularly to a generally modular design wherein each module contains a pair of evaporator stages served by an individual condenser partitioned into two condenser stages, with one condenser stage per each evaporator stage.

2. Description of the Prior Art

Within the field of seawater desalting, there are two basic design configurations which have been successfully and widely applied to the design of multi-stage flash evaporators since the advent of the MSF evaporator system in the 1950's. These design configurations are commonly referred to within the field as "cross-tube" ("cross-flow") and "long-tube" ("long-flow") design. This designation is derived from the orientation of the condenser tubing in relation to the direction of flow of the flashing brine stream as it progresses from evaporator stage to evaporator stage beneath the condenser tubing.

One of the primary advantages of the "cross-tube" configuration lies in its ability to operate with relatively low thermal losses at extremely low mass flow rates of the brine flowing from stage to stage. These low mass flow rates yield lower brine levels and permit the use of flash devices and flash enhancers which can significantly increase the brine/vapor interface areas resulting in more efficient flashing and reduced non-equilibrium losses. This in turn reduces the required heat transfer surface area for each stage of the condenser. In addition, the "cross-tube" configuration permits the passage of brine from stage to stage under very low pressure differential between stages without incurring high or unstable brine levels within the upstream stage, and thus permits the use of a greater number of stages within a fixed temperature differential. Vapor flashed within the "cross-tube" stage can flow in a uniform manner through the mesh entrainment separator to the full length of the condenser tubes within the tube bundle.

The primary disadvantage of the "cross-tube" multi-stage flash evaporator design configuration resides in its initial cost in that each stage of the unit comprises essentially an individual condenser with an inlet and an outlet tube sheet, attendant tube joints, and inlet and outlet water boxes which must be interconnected to each adjacent stage of the unit.

With respect to the "long-tube" design configuration, field experience in recent years has shown that the high mass flow rates which are common to this configuration often results in abnormally high brine levels and high thermal losses, particularly within the low temperature stages, and excessive erosion/corrosion by the flashing brine stream in the high temperature stages. Each stage of the "long-tube" configuration contains highly irregular or non-uniform vapor flow patterns as the flash vapor at the entrance flows toward the cooler end of the condenser. Another major disadvantage of the "long-tube" design configuration which is now beginning to be more prevalent among those evaporators installed in the 1960's is than when there is a condenser tube failure the distillate (product water) from a series of stages is contaminated. Frequently the evaporator is force off-the-line for location and plugging of the failed tube. However, in a tube failure within a "cross-tube" design, the distillate in each stage can be readily sampled and tested to rapidly determine the source of the leak and once the source is located the contaminated distillate can be diverted in such a manner as to permit the remaining stages to maintain high quality distillate production until it is convenient to initiate a shutdown of the unit for tube plugging.

The primary advantage of the "long-tube" design configuration is its minimal cost by way of minimizing the number of tube sheets, tube joints and water boxes to two per condenser tube pass (which may serve eight or more stages). This permits the use of relatively less expensive heat exhanger surface area with very long condenser tubes.

However, it is becoming increasingly evident in the field that the benefits of the "cross-tube" design may in fact override its additional expense over the "long-tube" design, especially if means can be devised to significantly reduce the cost of the "cross-tube" design.

SUMMARY OF THE PRESENT INVENTION

The multi-stage flash evaporator design of the present invention is in many respects similar to the "cross-tube" design configuration, retaining its typical advantages and in addition, reducing the overall initial expense thereof, in that each flash evaporator module houses two evaporator stages served by a single condenser tube bundle disposed in cross-flow orientation therein. The tube bundle incorporates a stage divider midway along its length to define two separate condenser chambers, with each condenser chamber in vapor flow communication with a separate flash evaporator chamber defined by a flash evaporator partition extending parallel with the tubes therebelow. Such configuration significantly reduces the number of end plates and rolled tube joints of the cross-flow design making it generally competitive with the long-tube design, however still retaining the technical advantages alluded to above of the cross-flow design in that the feed inlet to each evaporator chamber extends across the full length of the module (generally equivalent to the total length of the condenser tube bundle) and permits the use of flash enhancers and flash devices to maximize exposure of the brine feed to the internal conditions and in cross-flow relationship to the above-disposed condenser tube. However, for each evaporator chamber the vapors are directed therefrom to only approximately one-half of the condenser tube length which provides sufficient condensing surface area to condense the resulting vapors.

DESCRIPTION OF THE PREFERRED EMBODIMENT

According to the present invention, a pair of flash evaporator chambers are paired together in a tandem arrangement within a modular housing with each modular unit of such paired chambers served by one of two isolated portions of a single condenser unit disposed in cross-flow orientation thereabove.

Figure 1:
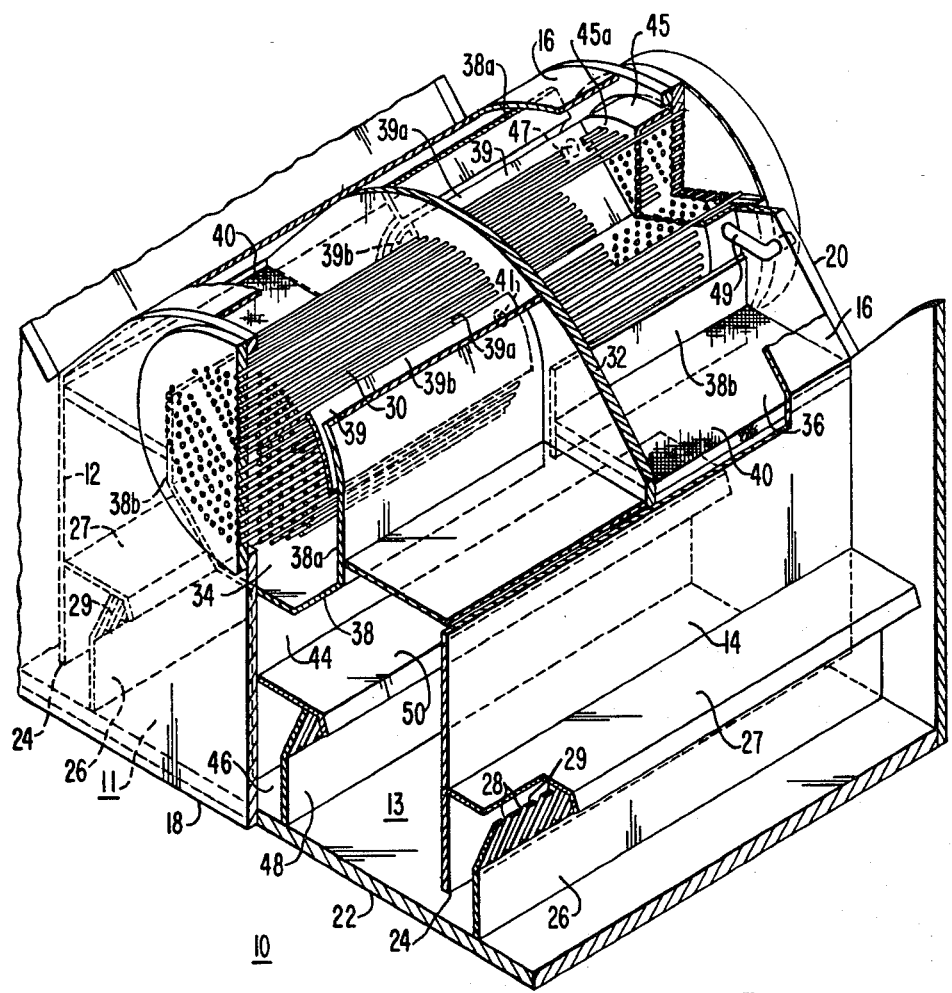
FIG. 1 is an isometric schematic of one unit typical of the multi-stage flash evaporator of the present invention with portions broken away to show the internal partitions defining the tandem evaporator stages and the separate condenser chambers.
Figure 2:
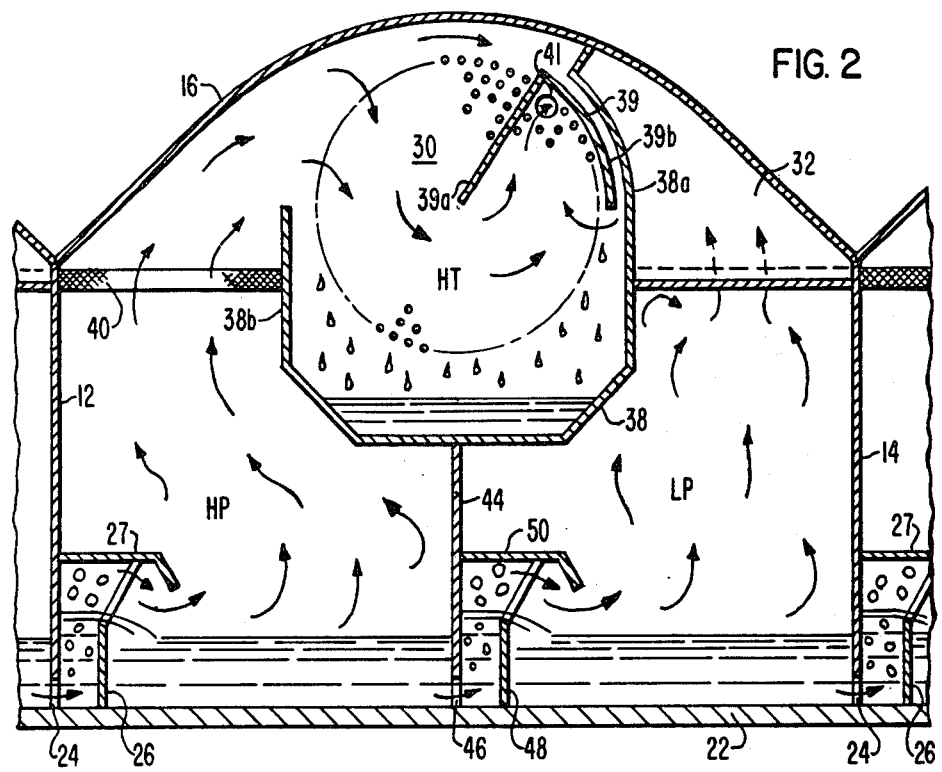
FIG. 2 is a cross-sectional schematic through the unit at the high temperature (i.e. upstream) stage condenser.
Figure 3:
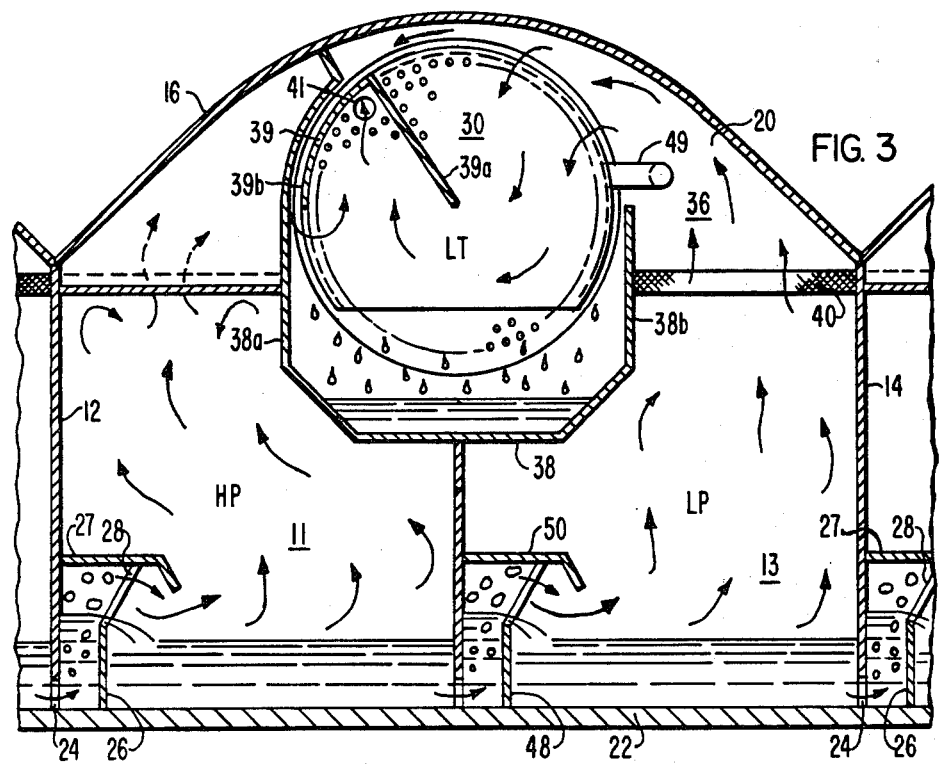
FIG. 3 is a view similar to FIG. 2 through the unit at the lower temperature (i.e. downstream) stage condenser; and, FIG. 4 is a top plan view of the unit.
Figure 4:
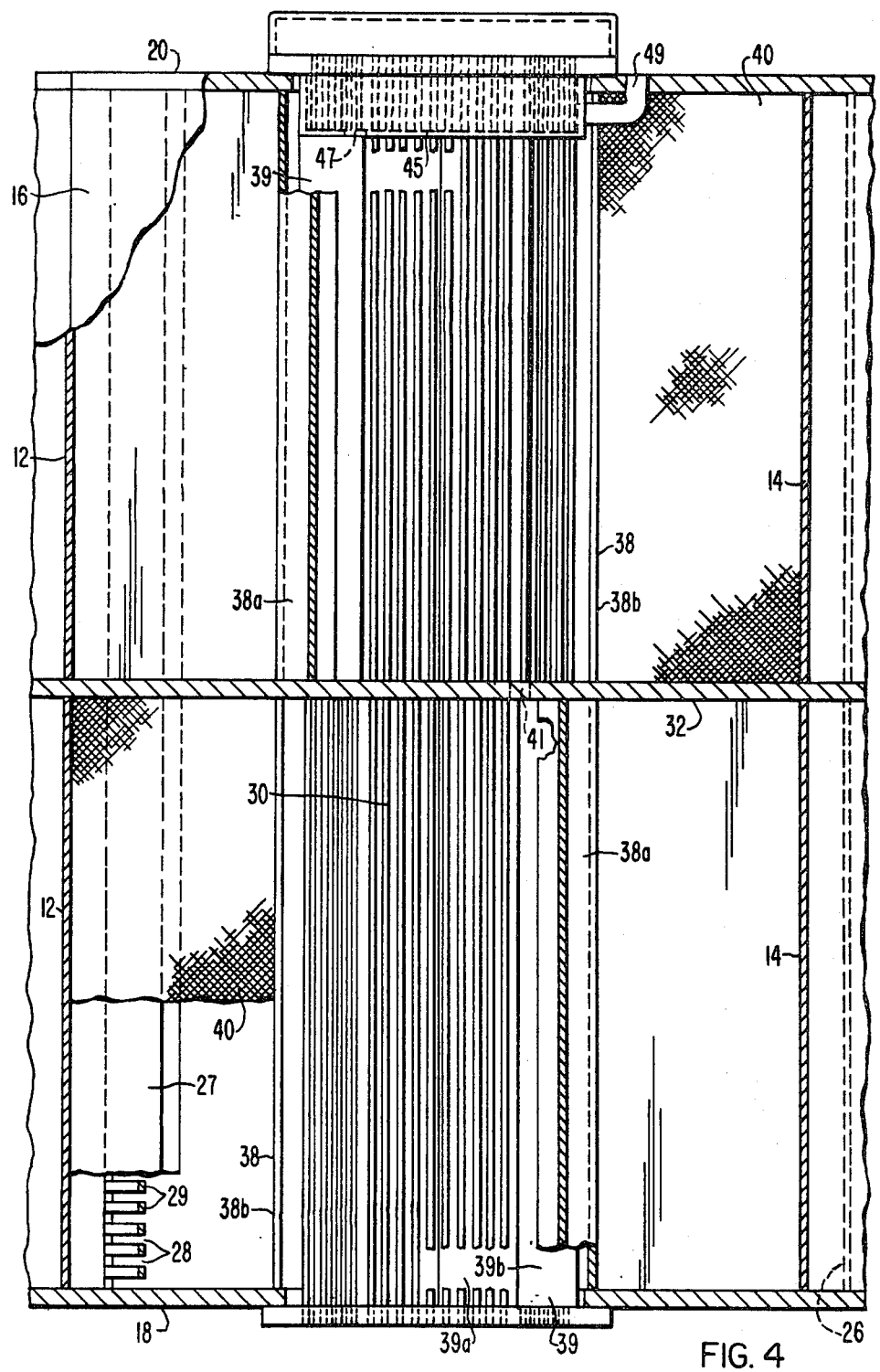

Thus, referring to FIGS. 1-4, one such paired-chamber unit 10 of a multi-stage flash evaporator is therein shown. It is to be understood that any number of such paired chamber units could be used to obtain the desired thermal efficiency and output capacity and that it is anticipated to include at least two of such units of the type shown.

Each paired chamber unit 10 comprises a housing structure defining the individual flash evaporator stages 11 and 13. (Evaporator stage 11 is the high temperature, high pressure stage of the two, whereas the other stage 13 is at a lower temperature and pressure.) Thus, as is seen, this structure includes an upstream wall 12 and a downstream wall 14 each extending the full length of the respective evaporator stages. In this case, a domed roof or top member 16 extends between the walls 12 and 14 and the two opposed ends are closed by end walls 18 and 20. A planar bottom member 22 (which continues as the bottom for the next adjacent modular unit) completes the structure to define a substantially rectangular enclosure having an arcuate top.

The walls 12 and 14 terminate a distance above the bottom 22 to define a brine feed opening 24 which also extends the full length of the housing and a dam member 26 projects upwardly from the bottom just downstream of the opening 24 to cause the brine to cascade thereover and increase exposure for vaporization thereof. A row of forwardly slanted, upwardly projecting slots 28 defining generally vertically extending spaces 29 therebetween are positioned on top of dam member 26 to provide a plurality of separate brine inlets (i.e. spaces 29) to maximize the vapor/liquid interface area. A horizontal shelf 27 projects forwardly into each chamber from each wall just above the dam member 26 and supports the top end of the slots 28 and extends slightly over the dam member to reduce brine droplets from being entrained in the upward vapor flow.

A single condenser tube bundle 30 extends across the width of the enclosure in the upper space subadjacent the domed top member 16. An upper stage divider or dividing wall 32 is disposed intermediate the two opposed ends 18, 20 to divide the upper domed portion of the unit 10 into two separate chambers 34, 36 with the tube bundle 30 passing through the dividing wall (i.e. each individual tube of the bundle is received in sealed engagement in individual openings in the wall 32) in a manner that generally maintains one chamber sealed from the other therethrough. It is to be understood that the opposite ends of the tubes are received in the tubesheets which are secured to the external side of the opposed walls and having attached thereto a hot water box adjacent end wall 18 and a cold water box adjacent end wall 20 to supply the water to the condenser tubes in a manner, although not shown, well known in the art.

A generally U-shaped distillate trough 38 is disposed subadjacent the condenser tube bundle 30 and extends generally from each end wall 18 and 20 to the dividing wall 32 with each upwardly projecting side or leg 38a, 38b, of the trough 38 generally spaced from the adjacent side wall 12, 14. However, it will be noted that one such leg 38a of the distillate collecting trough 38 on opposite sides of the dividing wall 32 extends upwardly and into sealing relationship with the dome top 16, and the space between the opposed leg 38b and its adjacent wall (12 in the high pressure stage and 14 in the low pressure stage) supports a horizontally disposed mesh 40 that permits vapor to flow therethrough substantially free of any entrained brine droplets. Thus, the upper (i.e. condenser) chamber is sealingly divided by the wall 32 and trough 38 into two separate condenser stages or chambers 34, 36, each having an individual vapor flow entry through the mesh 40 from the flash chamber therebelow.

A generally inverted V-shaped baffle member 39 is supported extending between the dividing wall 32 and the end walls 18, 20 in each chamber. The baffle 39 includes one leg 39a extending generally toward the center of the tube bundle 30 and the other leg 39b generally conforming to the outer perimeter of the tube bundle 30 on the side of the tube bundle 30 opposite the mesh 40 to establish a vapor flow path through the bundle as shown by the arrows. An orifice 41 in the dividing wall 32 adjacent the apex of the baffle in the chamber 34 permits the non-condensible vapors of this chamber to be vented into the condenser of the next stage 36. A shroud member 45 adjacent the wall 20 of the lower pressure chamber 13 encloses a portion (e.g. 1% to 2%) of the length of the condenser tube bundle 30 in this stage to define a vent condenser section. The lower portion of the shroud 45 is closed with drain holes provided to permit condensate to drain to the distillate trough 38. The baffle 39 of chamber 36 abuts the planar face 45a of the shroud member 45 and a vent orifice 47 in the face 45a generally adjacent the apex of the inverted V-shaped baffle 39 vents the non-condensible vapors of chamber 36 into the vent condenser section. An external vent 49 leads from the vent condenser section to externally of the chamber 36 and into the next lower temperature stage of the multistage unit.

A flash stage separating wall 44 depends vertically downwardly from the distillate trough 38 into the flash chamber and terminates a distance above the bottom 22 to define a brine entry 46 having a dam member 48 disposed downstream therefrom and supporting a shelf 50 to duplicate the brine entry opening provided on opposing walls 12 and 14. The partitioning wall 44 extends between and in sealing engagement with the opposed ends 18 and 20 of the enclosure and effectively divides the lower flash evaporator chamber into a pair of flash evaporator stages HT (high temperature) and LT (low temperature). As is seen, the vapor inlets into each condenser chamber are arranged such that each flash stage is in vapor flow communication with a separate and sealed portion of the single condenser.

Thus, as is seen, brine enters the first upstream or higher temperature HT stage flash evaporator through a flow orifice 24 which occupies the entire stage length of the housing as measured perpendicular to the direction of flow. The vapor which is flashed-off within this HT chamber flows through the mesh 40 where entrained brine droplets are removed before the vapor enters the condenser chamber 34. Vapor is condensed on the heat transfer surface of the condenser tubes to form the distillate which is collected in the distillate trough 38. Any non-condensible gases are vented to the next evaporator stage through the vent orifice 41. This sequence is essentially duplicated in the second or lower temperature stage with the vapor flowing through the mesh separator 40 associated with LT stage and enters the other portion 36 of the two stage condenser tube bundle. Any non-condensible vapors in this stage are vented into the vent condenser portion through orifice 47 and that portion of the vapors not condensed therein is ultimately externally vented to the next lower temperature stage. Thus, the design configuration according to the present invention permits the use of a single condenser tube bundle to serve, in cross-flow relationship, two flash evaporator stages. This provides a substantial reduction in the number of tube sheets, water boxes, and interconnecting piping and external venting over the "cross-flow" design yet retains the reduced heat transfer surface requirement normally associated with reduced thermal losses in such "cross-flow" design.

What is claimed is:

1. A multistage flash evaporator unit comprising structure defining a pair of flash evaporator chambers in series feed flow communication, said structure comprising:
   means defining a generally elongated enclosure having opposed sides defining the elongated dimension, opposed end walls and opposed top and bottom members;
   a dividing wall disposed in the upper portion of said enclosure generally intermediate and parallel to said opposed end walls and in sealing relationship with said top member;
   an intermediate wall member extending between said opposed end walls to separate said enclosure into an upper condenser portion and a lower evaporator portion, and cooperatively associated with said dividing wall to provide a pair of separate condenser chambers in said upper condenser portion;
   condenser means comprising an array of heat exchanger tubes extending between said opposed end walls in said upper condenser portion, said tubes projecting through and in generally sealing engagement with apertures in said dividing wall;
   a partitioning wall extending between said opposed end walls in said lower evaporator portion and generally parallel to and midway between said opposed sides and sealingly engaging said intermediate wall member to define a pair of evaporator chambers in said lower evaporator portion extending the full length of said unit;
   said side walls and said evaporation chamber partitioning wall each defining a fluid flow inlet adjacent said bottom member and extending generally throughout the length of said unit;
   first means defining a first vapor flow opening exclusively to one of said condenser chambers from one of said evaporator chambers and second means defining a second vapor flow opening exclusively to the other of said condenser chambers from the other of said evaporator chambers;
   baffle means in each condenser chamber and disposed in said condenser tube array to direct the vapor in a path therethrough;
   means for venting the non-condensed vapors of said first condenser chamber into said second condenser chamber; and,
   means for venting the non-condensed vapors of said second condenser chamber from said unit.

2. Structure according to claim 1 wherein flash evaporator enhancer means are disposed immediately downstream of each side wall and partitioning wall inlet to increase the vapor-liquid interface of said fluid flowing into each evaporator chamber, said first and second vapor flow openings extend along opposite sides of said condenser tube array; and,
   means are provided within each of said vapor flow openings for separating entrained liquid in said vapor to permit the passage therethrough primarily of vapor to said condenser chambers.

3. Structure according to claim 1 wherein said intermediate wall member defines a generally U-shaped member forming a condensate trough below said condenser tube array and wherein opposite upward extending legs of said U-shaped trough on opposite sides of said dividing wall are in sealing engagement with said enclosure and the remaining leg thereof on each side of said dividing wall member is spaced from the adjacent side of said enclosure to define said vapor flow openings to said condenser chambers.

4. Structure according to claim 1 wherein said baffle means comprises an inverted generally V-shaped member having one leg projecting into said condenser tube array and wherein the apex of said member is disposed generally opposite the vapor inlet area to said condenser chamber; and,
   wherein said vent means includes an opening through said dividing wall generally adjacent the apex of said baffle in said first condenser chamber.

5. Structure according to claim 4 including a shroud member generally enclosing a limited portion of said condenser tubes in said second condenser chamber generally adjacent the associated end wall; and
   vapor inlet means to said shroud enclosed space and vapor outlet means from said shroud enclosed space, said outlet means extending to the exterior of said unit.

6. A multi-stage flash evaporator unit for distilling seawater and the like in a plurality of serially connected adjacent evaporator chambers in which progressively lower temperatures exist in successive stages, said unit comprising an enclosure defined by opposed end walls, opposed side walls and opposed elongated top and bottom members and including:
   first wall means extending between said opposed end walls and separating said enclosure into an upper condenser portion and a lower evaporator portion;
   second wall means disposed in the upper condenser chamber generally intermediate and parallel to said opposed end walls and sealingly engaging said top member and said first wall means to divide said upper condenser portion into a first condenser chamber and a second condenser chamber;
   condenser means comprising a condenser tube bundle with the tubes extending between said opposed end walls and through appropriate sized apertures in said second wall means;
   third wall means disposed in said lower evaporator chamber generally intermediate and parallel to said opposed side walls and sealingly engaging said first wall means to divide said lower evaporator portion into a first evaporator chamber and a second evaporator chamber;
   means defined by each of said side walls and said third wall means generally adjacent said bottom member providing fluid flow inlet into said first and second evaporator chambers, said inlet means extending generally the full length of said side walls and said third wall means; and, means are provided adjacent each fluid flow inlet to said evaporator chambers for increasing the liquid-vapor interface area on the incoming liquid, said first wall means in cooperation with the adjacent side wall defines a first vapor flow inlet opening for vapor flow communication from said first evaporator chamber to said first condenser chamber and a second vapor flow inlet opening for vapor flow communication from said second evaporator chamber to said second condenser chamber;

first baffle means in said first condenser chamber and second baffle means in said second condenser chamber and wherein each said baffle means projects into said condenser tube array to direct the vapor flowing into the respective chamber through said array; and, orifice means in said second wall means for venting the non-condensed vapors of said first condenser chamber into said second condenser chamber; and means for venting the non-condensed vapors of said second condenser chamber from said unit.

7. Structure according to claim 6 wherein said first and second vapor flow openings extend along opposite sides of said condenser tube array; and, are provided within each said vapor flow opening for separating entrained liquid in said vapor to limit the passage therethrough to vapor from the respective evaporator chamber.

8. Structure according to claim 6 wherein means are provided adjacent each fluid flow inlet to said evaporator chambers for increasing the liquid-vapor interface area on the incoming liquid, said first wall means defines a generally U-shaped member forming a condensate trough below said condenser tube array and wherein opposite upwardly extending legs of said U-shaped trough on opposite sides of said dividing wall are in sealing engagement with said enclosure and the remaining leg thereof on opposite sides of said dividing wall of said enclosure to define said vapor flow openings to said condenser chambers.

9. Structure according to claim 6 including shroud means enclosing a limited portion of said condenser tubes in said second condenser chamber adjacent the end wall thereof and having a downwardly facing opening for passage of condensate formed on the tubes therein to said trough; and, vapor inlet means to said shroud enclosed space and vapor outlet means from said shroud enclosed space, said outlet means extending to the exterior of said unit.

10. Structure according to claim 6 wherein said baffle means comprises an inverted generally V-shaped member having at least one leg projecting into said condenser tube array and wherein the apex of said member is disposed generally opposite the vapor inlet area to said condenser chamber; and wherein said vent orifice in said second wall means and said vapor inlet means to said shroud enclosed space are disposed adjacent the apex of the baffle member in the first condenser chamber and second condenser chamber respectively.

11. A multistage flash evaporator unit for a multistage flash evaporation plant, wherein successive evaporation stages are operated at successively decreasing pressures to evaporate a solvent from a solution, said evaporator unit comprising:

a generally elongated enclosure having opposed end walls and elongated side and top and bottom walls extending therebetween;

said enclosure having a lower portion where the solvent is evaporated and an upper portion where the distillate is condensed;

divider wall means disposed in said upper enclosure portion and generally extending in a direction across said enclosure to divide said upper portion into a pair of separate condenser chambers staged in the longitudinal direction;

condenser means including an array of elongated heat exchanger tubes extending between said end walls to provide tube coolant flow in the longitudinal direction, said tubes extending through apertures in said divider wall means in generally sealing engagement with said wall means;

separation wall means extending between said end walls to separate said upper and lower enclosure portions and cooperating with said divider wall means and said enclosure top and said walls to define the successive condenser chambers;

means for collecting distillate for outflow from the condenser chambers;

partition wall means extending in said lower enclosure portion between said end walls and cooperating with said separation wall means and said side and end and bottom enclosure walls to define a pair of separate evaporation chambers staged in the cross-enclosure direction;

means for admitting and directing the solution in the cross-enclosure direction to and through said evaporation chambers to produce staged partial evaporation of the solvent;

means for directing flow of evaporated solvent from one of said evaporation chambers to one of said condenser chambers associated therewith in one evaporation stage;

means for directing flow of evaporated solvent from the other evaporation chamber to the other condenser chamber associated therewith in the next evaporation stage; and means for directing vapor in a path through said condenser tubes and for venting noncondensables from each condenser stage to a lower pressure location.

12. A flash evaporator unit as set forth in claim 11 wherein flash evaporator enhancer means are provided for increasing the vapor-liquid interface in each evaporation chamber.

13. A flash evaporator unit as set forth in claim 11 wherein said separation wall means is an elongated generally U-shaped member forming a condensate trough below said condenser tube array and wherein opposite upward extending legs of said U-shaped trough on opposite sides of said dividing wall are in sealing engagement with said enclosure and the remaining leg thereof on each side of said dividing wall means is spaced from the adjacent side of said enclosure to define said vapor flow openings to said condenser chambers.

14. A multistage flash evaporator unit for a multistage flash evaporation plant wherein successive evaporation stages are operated at successively decreasing pressures to evaporate a solvent from a solution, said evaporator unit comprising:

a generally elongated enclosure having opposed end walls and elongated side and top and bottom walls extending therebetween;

said enclosure having a lower portion where the solvent is evaporated and an upper portion wherein the distillate is condensed;

means for dividing said upper enclosure portion into a pair of separate condenser chambers staged in the longitudinal direction, condenser means including an array of elongated heat exchanger tubes extending between said end walls to provide tube coolant flow in the longitudinal direction; said tubes extending through apertures in said dividing means;

means for collecting distillate for outflow from the condenser chambers;

means for partitioning said enclosure lower portion to define a pair of separate evaporation chambers stages in the cross-enclosure direction;

means for separating said condenser chambers from said evaporation chambers and for directing flow of evaporated solvent from one of said evaporation chambers to one of said condenser chambers in one evaporation stage and from the other evaporation chamber to the other condenser chamber in the next evaporation stage;

means for admitting and directing the solution in the cross-enclosure direction to and through said evaporation chambers to produce staged partial evaporation of the solvent; and means for directing vapor in a path through said condenser tubes and for venting noncondensables from each condenser stage to a lower pressure location.

* * * * *